United States Patent
Marc

(10) Patent No.: US 10,225,892 B2
(45) Date of Patent: Mar. 5, 2019

(54) MICROWAVE HEATING APPARATUS AND METHOD

(71) Applicant: NOVATION IQ LLC, Lenexa, KS (US)

(72) Inventor: Michel Marc, Lenexa, KS (US)

(73) Assignee: NOVATION IQ LLC, Lenexa, KS (US)

(*) Notice: Subject to any disclaimer, the term of this patent is extended or adjusted under 35 U.S.C. 154(b) by 287 days.

(21) Appl. No.: 15/235,257

(22) Filed: Aug. 12, 2016

(65) Prior Publication Data

US 2018/0049280 A1 Feb. 15, 2018

(51) Int. Cl.
*H05B 6/70* (2006.01)
*B29C 35/00* (2006.01)
(Continued)

(52) U.S. Cl.
CPC ......... *H05B 6/705* (2013.01); *B29C 35/002* (2013.01); *B29C 35/0805* (2013.01);
(Continued)

(58) Field of Classification Search
CPC .... H05B 6/645; H05B 6/6458; H05B 6/6461; H05B 6/68; H05B 6/681; H05B 6/688; H05B 6/701; H05B 6/704; H05B 6/705; H05B 6/707; H05B 6/708; H05B 6/72; H05B 6/763; H05B 6/78; H05B 6/782; H05B 6/788; H05B 6/80; H05B 6/802; H05B 6/806; H05B 2206/044; H05B 2206/046; B29C 35/002; B29C 35/0805; B29C 35/10; B29C 2035/0855; B29K 2021/00
(Continued)

(56) References Cited

U.S. PATENT DOCUMENTS 4,631,380 A * 12/1986 Tran ..................... H05B 6/78
                                                        219/697
4,771,156 A    9/1988 Strattan et al.
(Continued)

FOREIGN PATENT DOCUMENTS

GB    1 525 819 A   9/1978
WO    WO 2014/075193 A1   5/2014

OTHER PUBLICATIONS

International Search Report and Written Opinion dated Dec. 11, 2017 from priority PCT/US2017/045910 filed Aug. 8, 2017 (10 pgs).

*Primary Examiner* — Hung D Nguyen

(74) *Attorney, Agent, or Firm* — Stinson Leonard Street LLP

(57) ABSTRACT

An apparatus and method for heating a material are disclosed. The apparatus includes one or more magnetron assemblies positioned on each of opposing sides of a heating region. The magnetron assemblies positioned on one side of the heating region generate overlapping microwaves that propagate in a first direction through the material, and the magnetron assemblies positioned on the other side of the heating region generate overlapping microwaves that propagate in a second direction through the material. The overlapping microwaves provide a total wave voltage that is substantially constant across the material resulting in substantially even heating of the material.

27 Claims, 6 Drawing Sheets

(51) Int. Cl.
*B29C 35/08* (2006.01)
*H05B 6/78* (2006.01)
*B29C 35/10* (2006.01)
*B29K 21/00* (2006.01)

(52) U.S. Cl.
CPC ............. *B29C 35/10* (2013.01); *H05B 6/707* (2013.01); *H05B 6/78* (2013.01); *B29C 2035/0855* (2013.01); *B29K 2021/00* (2013.01); *H05B 2206/044* (2013.01)

(58) Field of Classification Search
USPC ....... 219/690, 691, 693–696, 697, 698, 700, 219/701, 709, 761
See application file for complete search history.

(56) References Cited

U.S. PATENT DOCUMENTS

| | | | | |
|---|---|---|---|---|
| 4,870,236 A | * | 9/1989 | Berggren | ............... H05B 6/782 |
| | | | | 219/697 |
| 5,552,583 A | * | 9/1996 | Berteaud | ................ H05B 6/788 |
| | | | | 219/693 |
| 5,834,744 A | * | 11/1998 | Risman | .................. H05B 6/681 |
| | | | | 219/697 |
| 6,900,421 B2 | * | 5/2005 | Varma | .................... H05B 6/806 |
| | | | | 219/709 |
| 8,357,726 B2 | | 1/2013 | Marc | |
| 8,470,897 B2 | | 6/2013 | Marc | |
| 8,602,927 B2 | | 12/2013 | Marc | |
| 8,815,964 B2 | | 8/2014 | Marc | |
| 8,961,889 B2 | | 2/2015 | Marc | |
| 9,162,114 B1 | | 10/2015 | Marc | |

\* cited by examiner

MICROWAVE HEATING APPARATUS AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Electromagnetic waves with frequencies in the microwave portion of the electromagnetic spectrum (sometimes referred to as microwaves) have been used to heat, dry or otherwise process materials in a variety of different commercial or industrial applications. When microwaves are applied to a material, the waves cause molecules in the material to vibrate and generate heat. However, microwave energy decreases as the waves penetrate further into the material causing uneven heating of the material. Non-uniform heat distribution results in underexposed and overexposed material in the same batch. Thus, the use of microwave energy is not particularly well-suited for applications that require substantially even heating of the material.

BRIEF SUMMARY OF THE INVENTION

The present invention is directed to an apparatus and method for drying, molding, curing or otherwise heating a material. In exemplary embodiments, the apparatus includes a heating region configured to receive the material and one or more magnetron assemblies positioned on opposing sides of the heating region. Each of the magnetron assemblies comprises a magnetron associated with a waveguide that extends between a closed end and an open end. Each magnetron has an antenna that penetrates the associated waveguide at a specified location so as to create two overlapping microwaves with a phase shift therebetween. Specifically, each magnetron generates (i) an unreflected wave that propagates toward the open end of the waveguide and (ii) a reflected wave that propagates toward the closed end of the waveguide, reflects off the closed end, and propagates toward the open end of the waveguide. The reflected wave is out of phase with the unreflected wave and each of the waves has a frequency in the range of about 0.3 GHz to about 300 GHz.

In one embodiment, the heating region includes a surface for supporting the material between the open ends of the waveguides of the magnetron assemblies whereby the material is heated in a batch mode of operation. In another embodiment, the heating region includes a conveyor for continuously feeding the material between the open ends of the waveguides of the magnetron assemblies whereby the material is heated in a continuous mode of operation.

The number of magnetron assemblies and overlapping microwaves needed for a particular application will depend on a variety of factors, such as the type of material being heated, the thickness and width of the material, the desired heating time, the speed of any conveyor used, the total voltage to be applied, the frequency of the microwaves, and the purpose for which the material is being heated (e.g., a drying application vs. a molding or curing application).

In one example, one magnetron assembly is positioned on a first side of the heating region and generates two overlapping microwaves (i.e., the unreflected and reflected waves from the magnetron assembly) with a phase shift of 90 degrees between individual microwaves. Similarly, one magnetron assembly is positioned on a second side of the heating region and generates another two overlapping microwaves (i.e., the unreflected and reflected waves from the magnetron assembly) with a phase shift of 90 degrees between individual microwaves.

In another example, two magnetron assemblies are positioned on a first side of the heating region and generate four overlapping microwaves (i.e., the unreflected and reflected waves from each of the two magnetron assemblies) with a phase shift of 45 degrees between individual microwaves. Similarly, two magnetron assemblies are positioned on a second side of the heating region and generate another four overlapping microwaves (i.e., the unreflected and reflected waves from each of the two magnetron assemblies) with a phase shift of 45 degrees between individual microwaves.

In yet another example, four magnetron assemblies are positioned on a first side of the heating region and generate eight overlapping microwaves (i.e., the unreflected and reflected waves from each of the four magnetron assemblies) with a phase shift of 22.5 degrees between individual microwaves. Similarly, four magnetron assemblies are positioned on a second side of the heating region and generate eight overlapping microwaves (i.e., the unreflected and reflected waves from each of the four magnetron assemblies) with a phase shift of 22.5 degrees between individual microwaves.

In each of these examples, the overlapping microwaves generated by each magnetron assembly positioned on the first side of the heating region propagate in a first direction through the material, and the overlapping microwaves generated by each magnetron assembly positioned on the second side of the heating region propagate in a second opposing direction through the material. Because the overlapping microwaves propagate in opposing directions, the total wave voltage for all of the waves is substantially constant across the material. This substantially constant voltage results in substantially even heating of the material so as to overcome the above-mentioned problems associated with certain microwave systems of the prior art.

BRIEF DESCRIPTION OF THE DRAWINGS

Various exemplary embodiments of the present invention are described in detail below with reference to the attached drawing figures, wherein.

DETAILED DESCRIPTION OF EXEMPLARY EMBODIMENTS

Figure 1:
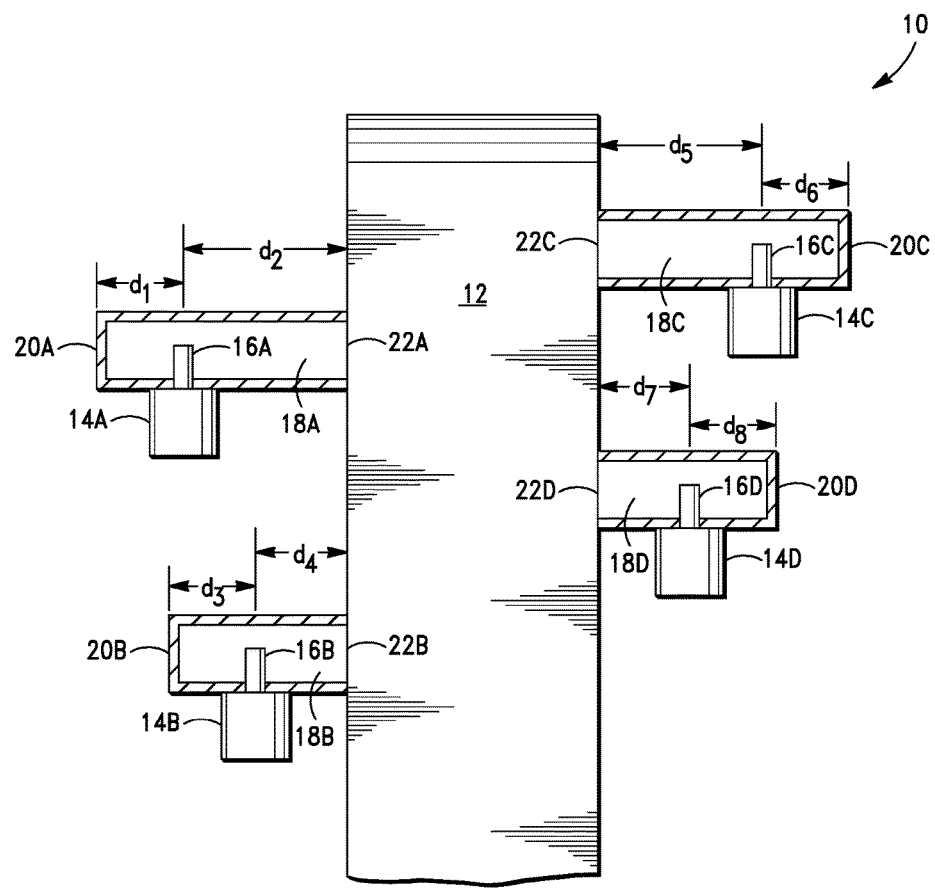
FIG. 1 is an exemplary heating apparatus for heating a material in accordance with a first embodiment of the present invention.

The present invention is directed to an apparatus and method for heating a material by applying overlapping microwaves, i.e., microwaves with a phase shift therebetween, to opposing sides of the material. While the invention will be described in detail below with reference to various exemplary embodiments, it should be understood that the invention is not limited to the specific configuration or methodology of these embodiments. In addition, although the exemplary embodiments are described as embodying several different inventive features, one skilled in the art will appreciate that any one of these features could be implemented without the others in accordance with the invention.

In general terms, the heating apparatus of the present invention includes a plurality of microwave energy sources (e.g., magnetrons) that apply overlapping microwaves to opposing sides of a material in such a manner as to provide a total wave voltage that is substantially constant across the material. As used herein, the term "substantially constant voltage" or similar terms with respect to a material means that the difference between the total wave voltage at a point on or within the material compared to the total wave voltage at each other point on or within the material is less than about 20% and preferably less than about 10%, for example less than about 10%, 9%, 8%, 7%, 6%, 5%, 4%, 3%, 2%, 1% or some value therebetween. This substantially constant voltage results in substantially even heating of the material. As used herein, the term "substantially even heating" or similar terms with respect to a material means that the difference between the temperature at a point on or within the material compared to the temperature at each other point on or within the material is less than about 40° C. and preferably less than about 20° C., for example less than about 20° C., 19° C., 18° C., 17° C., 16° C., 15° C., 14° C., 13° C., 12° C., 11° C., 10° C., 9° C., 8° C., 7° C., 6° C., 5° C., 4° C., 3° C., 2° C., 1° C. or some value therebetween. One skilled in the art will appreciate that the acceptable temperature variance across the material will depend on the application, e.g., a drying application may be able to tolerate a greater temperature variance than a molding or curing application.

The materials that may be heated in accordance with the present invention may comprise any materials capable of being dried, molded, cured, or otherwise heated via the application of microwaves as described herein. For example, a variety of different materials may be molded or cured including, but not limited to, thermoplastics and thermosets. Exemplary thermoplastics include ABS, acetal, acrylic (plexiglass), methylacrylate, polyamide (nylon), polycarbonate, polyester, ethylene vinyl acetate (EVA), ethylene vinyl alcohol, ethylene methyl acrylate, polyvinyl chloride (PVC), plastisol, polyvinylidene fluoride, surlyn ionomeror, thermoplastic urethane, and thermoplastic olefin. Exemplary thermosets include acrylic, epoxy, phenolic, polyester, melamine formaldehyde, composites, and rubbers. It may also be desirable to mix a blowing agent and/or cross-linker with a material to form a foam material. Exemplary foam materials include cross-linked PE-EVA foam, PVC foam, vinyl nitrile foam, and neoprene foam. Of course, other thermoplastics, thermosets, and foam materials may also be heated in accordance with the present invention.

The overlapping microwaves applied to each side of the material have a phase shift between individual microwaves, e.g., a 90 degree phase shift between individual microwaves, a 45 degree phase shift between individual microwaves, a 22.5 degree phase shift between individual microwaves, or some multiple of the foregoing. In one exemplary embodiment, four overlapping microwaves are applied to a first side of the material and propagate in a first direction through the material (wherein the individual microwaves have a 45 degree phase shift therebetween) and another four overlapping microwaves are applied to a second side of the material and propagate in a second opposing direction through the material (wherein the individual microwaves have a 45 degree phase shift therebetween). Thus, the four overlapping microwaves applied to each side of the material consist of a first microwave with no phase shift, a second microwave having a 45 degree phase shift from the first microwave, a third microwave having a 90 degree phase shift from the first microwave, and a fourth microwave having a 135 degree phase shift from the first microwave. As will be discussed below, the total voltage of the eight microwaves is substantially constant across the material, which results in substantially even heating of the material.

In another exemplary embodiment, eight overlapping microwaves are applied to a first side of the material and propagate in a first direction through the material (wherein the individual microwaves have a 22.5 degree phase shift therebetween) and another eight overlapping microwaves are applied to a second side of the material and propagate in a second opposing direction through the material (wherein the individual microwaves have a 22.5 degree phase shift therebetween). Thus, the eight overlapping microwaves applied to each side of the material consist of a first microwave with no phase shift, a second microwave having a 22.5 degree phase shift from the first microwave, a third microwave having a 45 degree phase shift from the first microwave, a fourth microwave having a 67.5 degree phase shift from the first microwave, a fifth microwave having a 90 degree phase shift from the first microwave, a sixth microwave having a 112.5 degree phase shift from the first microwave, a seventh microwave having a 135 degree phase shift from the first microwave, and an eighth microwave having a 157.5 degree phase shift from the first microwave. Again, the total voltage of the sixteen microwaves is substantially constant across the material, which results in substantially even heating of the material.

It should be understood that the number of overlapping microwaves applied to each side of a material may vary (e.g., as few as two overlapping microwaves and as many as sixteen overlapping microwaves or more). The number of overlapping microwaves needed for a particular application will depend on a variety of factors, such as the type of material being heated, the thickness and width of the material, the desired heating time (i.e., a greater number of overlapping microwaves will shorten the heating time), the speed of any conveyor used (i.e., a greater number of overlapping microwaves will enable a faster conveyor speed), the total voltage to be applied, the frequency of the microwaves, and the purpose for which the material is being heated (e.g., a drying application vs. a molding or curing application).

FIG. 1 illustrates an exemplary heating apparatus 10 in accordance with a first embodiment of the present invention. In general, a material to be heated is placed on a surface 12 of a heating region within apparatus 10. As discussed below, apparatus 10 can be operated in a batch mode (in which case material is placed on surface 12 in batches) or in a continuous mode (in which case material is continuously fed through the apparatus on surface 12, i.e., surface 12 acts as a conveyor). In this embodiment, four magnetrons 14A, 14B, 14C, 14D are provided, namely, magnetrons 14A and 14B are positioned on the left side of surface 12 and magnetrons 14C and 14D are positioned on the right side of surface 12. Magnetrons 14A, 14B, 14C, 14D each have an antenna 16A, 16B, 16C, 16D that penetrates a side of and extends into a waveguide 18A, 18B, 18C, 18D. In this example, waveguides 18A, 18B, 18C, 18D each comprise a hollow metal tube with a rectangular cross section that extends between a closed end 20A, 20B, 20C, 20D and an open end 22A, 22B, 22C, 22D. As can be seen, open ends 22A, 22B, 22C, 22D are positioned in close proximity to the material on surface 12.

Magnetrons 14A, 14B, 14C, 14D are coupled to waveguides 18A, 18B, 18C, 18D such that antennas 16A, 16B, 16C, 16D are positioned (i) a distance of d1, d3, d6, d8 from closed ends 20A, 20B, 20C, 20D, respectively and (ii) a distance of d2, d4, d5, d7 from open ends 22A, 22B, 22C, 22D, respectively. Although FIG. 1 shows the positions of waveguides 18A and 18B as being offset from the positions of waveguides 18C and 18D, waveguide 18A could be in line with waveguide 18C and/or waveguide 18B could be in line with waveguide 18D. Alternatively, the positions of the waveguides could be offset even more than the offsets shown in FIG. 1. Additionally, although FIG. 1 shows a certain distance between waveguides 18A and 18B on the left side of apparatus 10 and a certain distance between waveguides 18C and 18D on the right side of apparatus 10, the distance between waveguides on each side of surface 12 is not critical and could be different than the distances shown.

Magnetrons 14A, 14B, 14C, 14D each generate a microwave signal that is substantially a sinusoid with a wavelength $\lambda$. In operation, when magnetrons 14A, 14B, 14C, 14D generate microwave signals, approximately 50% of the microwaves propagate towards closed ends 20A, 20B, 20C, 20D and approximately 50% of the microwaves propagate towards open ends 22A, 22B, 22C, 22D. The microwaves that propagate towards open ends 22A, 22B, 22C, 22D (each referred to as a "generated wave") travel a distance of d2, d4, d5, d7, respectively, before entering the material. The microwaves that propagate toward closed ends 20A, 20B, 20C, 20D (each referred to as a "reflected wave") travel a distance of d1, d3, d6, d8, respectively, before they reflect off closed ends 20A, 20B, 20C, 20D and then travel a distance of d1+d2, d3+d4, d6+d5, d8+d7, respectively, before entering the material. The additional distance travelled by each reflected wave represents a phase shift between the generated wave and the reflected wave. As a result, each of magnetrons 14A, 14B, 14C, 14D generates two waves—a generated wave and a reflected wave—that overlap each other.

In this embodiment, with reference to magnetrons 14A and 14B positioned on the left side of surface 12, the distances d1, d2, d3 and d4 are selected such that the phase shift between the generated and reflected waves for the two magnetrons (i.e., a total of four waves) is 45 degrees or $\frac{1}{8}\lambda$ between the individual waves. In one example, d3 is $\frac{1}{8}\lambda$, d4 is $\lambda$, d1 is $\frac{1}{8}\lambda$, and d2 is $\lambda+\frac{1}{8}\lambda$. Thus, the generated wave for magnetron 14B travels a distance of $\lambda$ before entering the material, the generated wave for magnetron 14A travels a distance of $\lambda+\frac{1}{8}\lambda$ before entering the material, the reflected wave for magnetron 14B travels a distance of $\frac{1}{8}\lambda+\frac{1}{8}\lambda+\lambda$ (i.e., $\lambda+\frac{2}{8}\lambda$) before entering the material, and the reflected wave for magnetron 14A travels a distance of $\frac{1}{8}\lambda+\frac{1}{8}\lambda+\lambda+\frac{1}{8}\lambda$ (i.e., $\lambda+\frac{3}{8}\lambda$) before entering the material. Thus, the phase shift between the individual microwaves is 45 degrees, as follows: (1) the generated wave for magnetron 14B is the initial wave with no phase shift, (2) the generated wave for magnetron 14A has a 45 degree phase shift from the initial wave, (3) the reflected wave for magnetron 14B has a 90 degree phase shift from the initial wave, and (4) the reflected wave for magnetron 14A has a 135 degree phase shift from the initial wave. One skilled in the art will understand that the distances d1, d2, d3 and d4 can be any distances that result in a 45 degree phase shift between the individual microwaves generated by magnetrons 14A and 14B.

Figure 2:
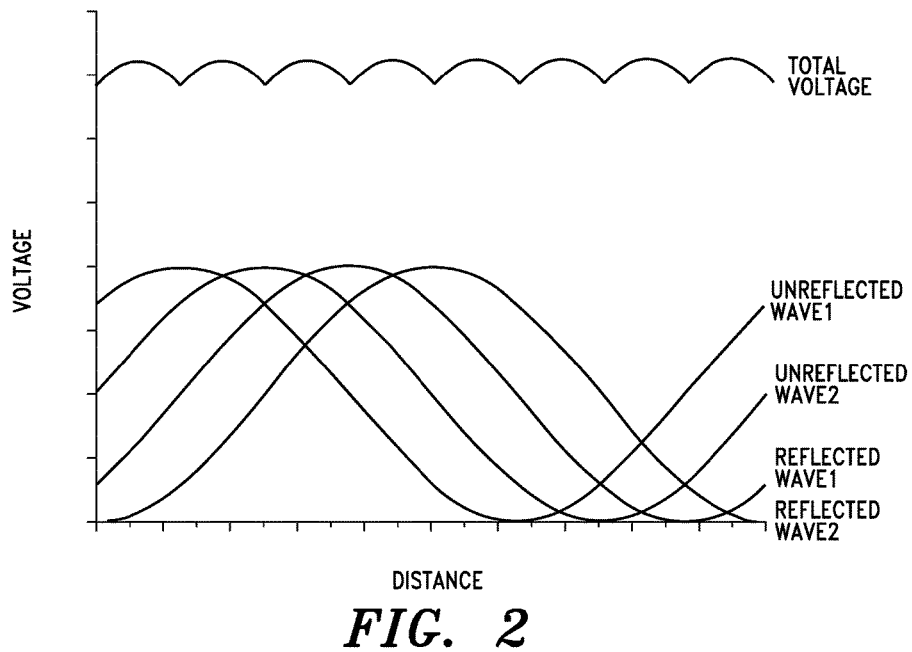
FIG. 2 shows a single period of the four overlapping waves generated by two magnetrons positioned on one side of the apparatus of FIG. 1.

FIG. 2 illustrates a single period for the four overlapping microwaves generated by magnetrons 14A and 14B, wherein the voltage of the microwaves is shown as a function of the distance through which the microwaves penetrate into the material. In this example, the generated wave for magnetron 14B is identified as "unreflected wave 1," the generated wave for magnetron 14A is identified as "unreflected wave 2," the reflected wave for magnetron 14B is identified as "reflected wave 1," and the reflected wave for magnetron 14A is identified as "reflected wave 2." The "total voltage" wave is the sum of the four overlapping microwaves. Because there is a 45 degree phase shift between the individual microwaves, the total voltage of the microwaves applied to the material is substantially constant during this single period. However, as will now be described, the total voltage of the microwaves will decrease as the microwaves penetrate further into the material.

Figure 3A:
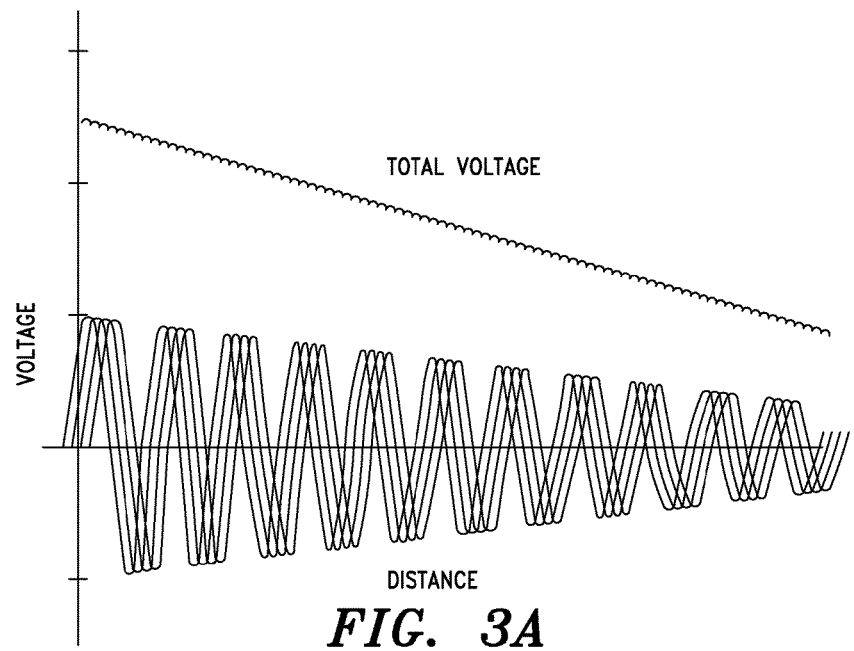
FIG. 3A shows the four overlapping waves generated by the two magnetrons positioned on the left side of the apparatus of FIG. 1 as the waves penetrate the material from left to right, as well as the total voltage of those waves.

FIG. 3A shows the voltage of the four overlapping microwaves generated by magnetrons 14A and 14B as the microwaves penetrate into the material. As can be seen, the four overlapping microwaves propagate through the material from left to right. As the microwaves penetrate into the material, the voltage of the microwaves decreases with distance. The "total voltage" wave is the sum of the four overlapping microwaves, which also decreases as the microwaves penetrate into the material. This decrease in voltage as the microwaves penetrate into the material results in uneven heating of the material with the left side being heated more than the right side.

With reference to magnetrons 14C and 14D positioned on the right side of surface 12, the distances d5, d6, d7, d8 are selected such that the phase shift between the generated and reflected waves for the two magnetrons is 45 degrees. One skilled in the art will appreciate that the manner in which such distances are chosen is the same as that described above for distances d1, d2, d3, d4.

Figure 3B:
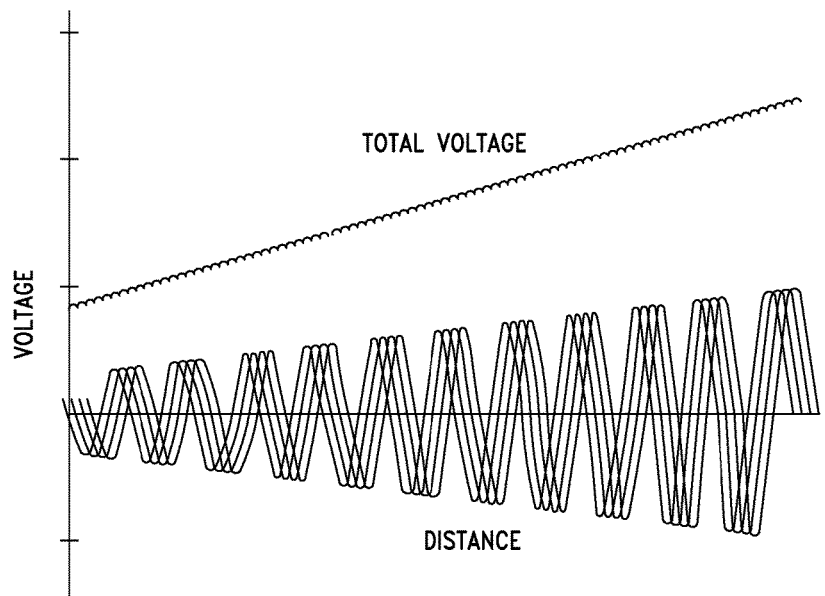
FIG. 3B shows the four overlapping waves generated by the two magnetrons positioned on the right side of the apparatus of FIG. 1 as the waves penetrate the material from right to left, as well as the total voltage of those waves.

FIG. 3B shows the voltage of the four overlapping microwaves generated by magnetrons 14C and 14D as the microwaves penetrate into the material. As can be seen, the four overlapping microwaves propagate through the material from right to left (i.e., a mirror image of the four overlapping microwaves generated by magnetrons 14A and 14B). As the microwaves penetrate into the material, the voltage of the microwaves decreases with distance. The "total voltage" wave is the sum of the four overlapping microwaves, which also decreases as the microwaves penetrate into the material. This decrease in voltage as the microwaves penetrate into the material results in uneven heating of the material with the right side being heated more than the left side.

Figure 3C:
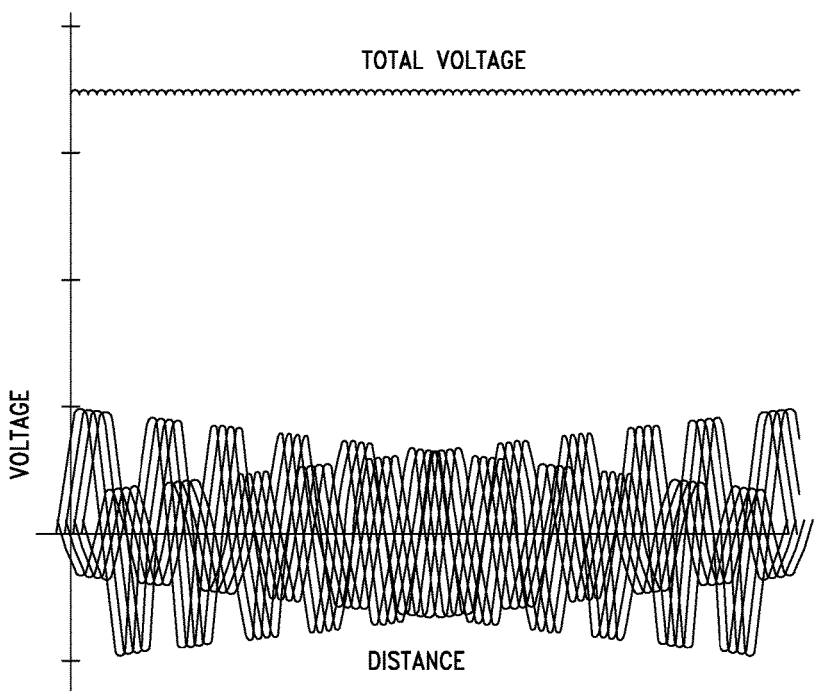
FIG. 3C shows the four overlapping waves of FIG. 3A and the four overlapping waves of FIG. 3B as they penetrate the material.

FIG. 3C shows the four overlapping microwaves generated by magnetrons 14A and 14B as the microwaves propagate through the material from left to right (i.e., the microwaves shown in FIG. 3A) and the four overlapping microwaves generated by magnetrons 14C and 14D as the microwaves propagate through the material from right to left (i.e., the microwaves shown in FIG. 3B). The total voltage wave is the sum of the four overlapping microwaves from magnetrons 14A and 14B and the four overlapping microwaves from magnetrons 14C and 14D (i.e., the sum of all eight microwaves). Because the four overlapping microwaves generated by magnetrons 14A and 14B enter the material from the left side of surface 12 and the four overlapping microwaves generated by magnetrons 14C and 14D enter the material from the right side of surface 12, the total voltage of the eight microwaves applied to the material is substantially constant across the material. This results in substantially even heating of the material. The total voltage of the eight microwaves applied to the material will vary depending on the application and the desired amount of heating, but will typically be in the range of 1,000 V to 10,000 V.

It should be understood that waveguides 18A and 18B are positioned in relation to waveguides 18C and 18D such that the distance between open end 22A and open end 22C is $x\lambda+\lambda/2$ where x is a positive integer (e.g., 1½λ, 2½λ, 3½λ, etc.) and, similarly, the distance between open end 22B and open end 22D is $x\lambda+\lambda/2$ where x is a positive integer (e.g., 1½λ, 2½λ, 3½λ, etc.). This enables the provision of the overlapping waveforms shown in FIG. 3C. Of course, it should be understood that there is a limit to the value of x, i.e., the distance between the open ends of the waveguides must not be so great as to prohibit the substantially even heating of the material.

As mentioned above, heating apparatus 10 can be operated in a batch mode or in a continuous mode. In batch mode, a batch of material is placed on surface 12 either manually by a person or automatically by a machine. Magnetrons 14A, 14B, 14C, 14D are then activated for a period of time. Then, at the end of the heating period, the material is removed from surface 12 either manually by a person or automatically by a machine. The next batch of material may then be heated in the same manner. In continuous mode, material is continuously fed through the apparatus on surface 12, i.e., surface 12 acts as a conveyor. In this case, magnetrons 14A, 14B, 14C, 14D remain activated for as long as material is being fed through the apparatus. It should be understood that heating apparatus 10 is particularly well-adapted for operation in continuous mode because all of the material on surface/conveyor 12 is heated as it passes between waveguides 18A, 18B, 18C, 18D. By contrast, in batch mode, some of the material on surface 12 is not positioned between any of waveguides 18A, 18B, 18C, 18D and, thus, would not be heated. Thus, in batch mode, the length of the material is preferably limited to the output area of the waveguides and/or a larger number of magnetrons/waveguides are preferably used in order to heat all of the material. In view of these limitations, continuous mode is preferred to batch mode in many applications.

Magnetrons 14A, 14B, 14C, 14D each generate microwaves at frequencies ranging from about 0.3 GHz to about 300 GHz. In industrial applications, microwaves are generated at 0.915 GHz (i.e., 915 MHz). In other applications, microwaves may be generated at either 2.45 GHz or 5.80 GHz. The wavelength of each sinusoidal microwave generated by magnetrons 14A, 14B, 14C, 14D is expressed as follows:

$$\lambda = \frac{c}{f} \quad (1)$$

where
  λ=wavelength of sinusoidal microwave in meters;
  c=speed of light ($3\times10^8$ m/sec); and
  f=frequency of sinusoidal microwave in hertz.

Using equation (1), the wavelength of a sinusoidal microwave generated at 0.915 GHz is as follows:

$$\lambda = \frac{3\times10^8}{0.915\times10^9} = 32.79 \text{ centimeters} = 12.91 \text{ inches} \quad (2)$$

Thus, if magnetrons 14A, 14B, 14C, 14D generate microwaves at 0.915 GHz, the distance d3 is 1.61 inches (i.e., ⅛λ=12.91/8 inches=1.61 inches), the distance d4 is 12.91 inches (i.e., =12.91 inches), the distance d1 is 1.61 inches (i.e., ⅛=12.91/8 inches=1.61 inches), and the distance d2 is 14.52 inches (i.e., +⅛λ=12.91 inches+1.61 inches=14.52 inches). Similar calculations can be made for distances d5, d6, d7, d8.

As another example, the wavelength of a sinusoidal microwave generated at 2.45 GHz is as follows:

$$\lambda = \frac{3\times10^8}{2.45\times10^9} = 12.24 \text{ centimeters} = 4.82 \text{ inches} \quad (2)$$

Thus, if magnetrons 14A, 14B, 14C, 14D generate microwaves at 2.45 GHz, the distance d3 is 0.60 inches (i.e., ⅛λ=4.82/8 inches=0.60 inches), the distance d4 is 4.82 inches (i.e., =4.82 inches), the distance d1 is 0.6 inches (i.e., ⅛λ=4.82/8 inches=0.60 inches), and the distance d2 is 5.42 inches (i.e., λ+⅛λ=4.82 inches+0.60 inches=5.42 inches). Similar calculations can be made for distances d5, d6, d7, d8.

As another example, the wavelength of a sinusoidal microwave generated at 5.80 GHz is as follows:

$$\lambda = \frac{3\times10^8}{5.80\times10^9} = 5.17 \text{ centimeters} = 2.04 \text{ inches} \quad (3)$$

Thus, if magnetrons 14A, 14B, 14C, 14D generate microwaves at 5.80 GHz, the distance d3 is 0.255 inches (i.e., ⅛λ=2.04/8 inches=0.255 inches), the distance d4 is 2.04 inches (i.e., =2.04 inches), the distance d1 is 0.255 inches (i.e., ⅛λ=2.04/8 inches=0.255 inches), and the distance d2 is 2.297 inches (i.e., λ+⅛λ=2.042 inches+0.255 inches=2.297 inches). Again, similar calculations can be made for distances d5, d6, d7, d8.

Thus, one skilled in the art will appreciate that the distances d1-d8 are directly dependent on the desired frequency of the microwaves generated by magnetrons 14A, 14B, 14C, 14D.

FIGS. 4-7 illustrate an exemplary heating apparatus 110 in accordance with a second embodiment of the present invention. Apparatus 110 is a specific example of an apparatus that operates in a continuous mode and provides substantially uniform heating of a material via the application of overlapping microwaves using the same principles described above in connection with heating apparatus 10.

Figure 4:
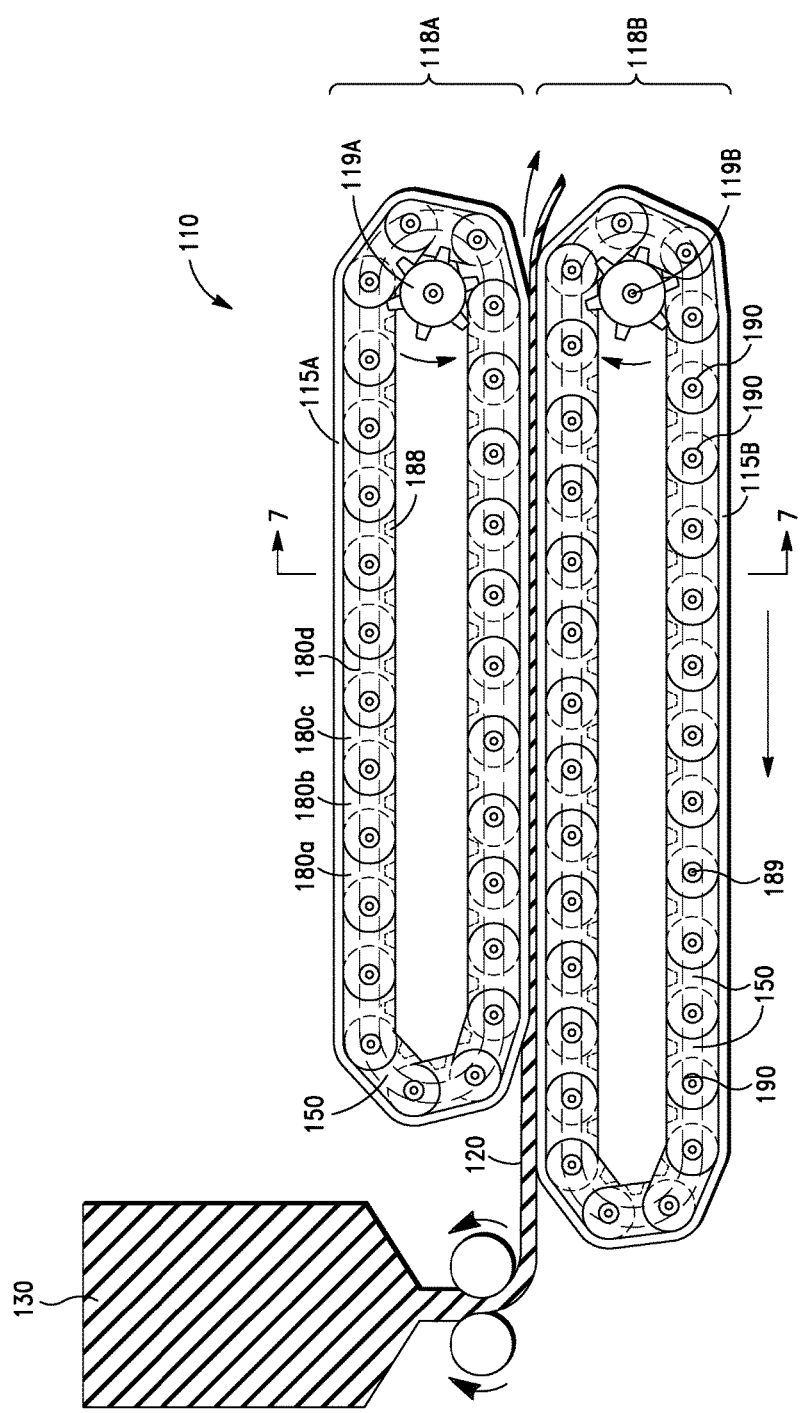
FIG. 4 is an exemplary heating apparatus for heating a material in accordance with a second embodiment of the present invention.

Referring to FIG. 4, apparatus 110 includes a first conveyor 118A and a second conveyor 118B each of which has a conveying belt 115A, 115B driven by a driver 119A, 119B. Conveyors 118A, 118B are designed for continuously feeding a material 120 between the open ends of four waveguides (discussed below). Material 120 is preferably metered through an extruder or hopper 130 to the first and second conveyors 118A, 118B to form a generally continuous sheet of material. Conveyors 118A, 118B generally compress the material 120, which assists with removal of air from the material. Conveying belts 115A, 115B are preferably made of a material that undergoes limited heating during the heating process and that has low friction so as to facilitate removal of the material, such as silicone rubber with a Teflon™ coating available from Chemours.

Figure 5:
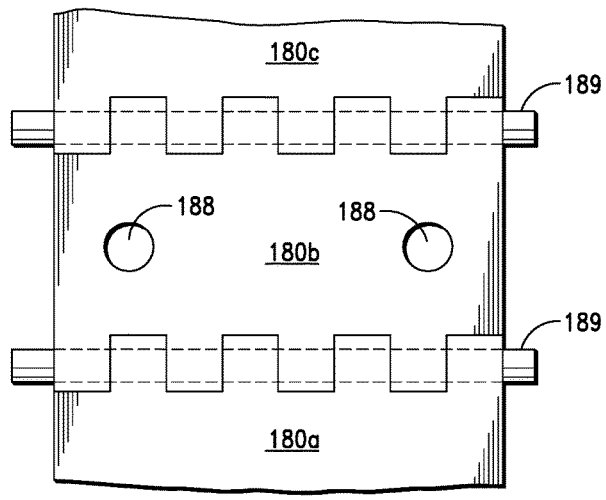
FIG. 5 is a top view of a portion of the conveyors shown in FIG. 4 illustrating the adjacent plate sections held together by shafts.
Figure 6:
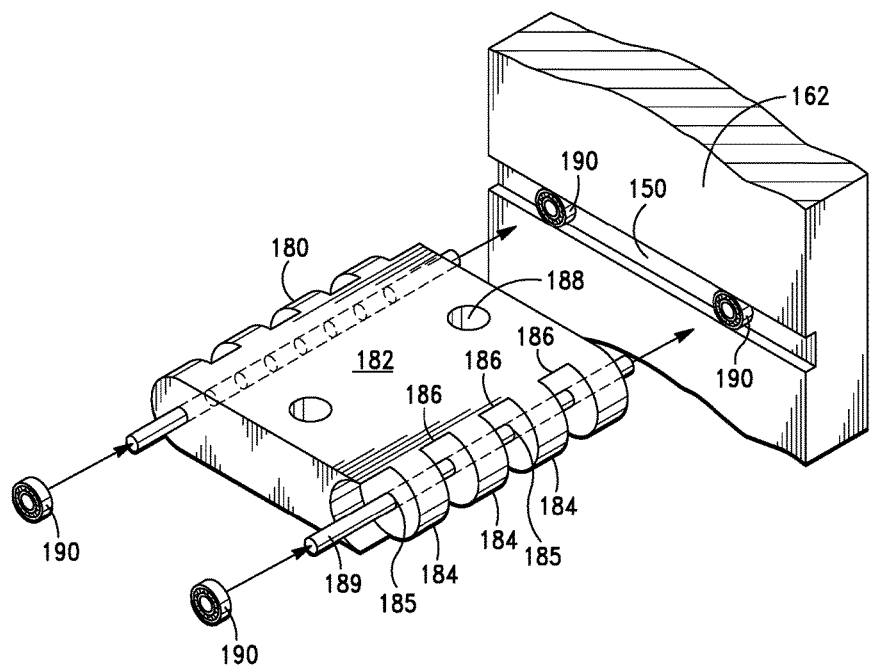
FIG. 6 is an exploded view of a plate section shown in FIG. 5 illustrating how the shaft and ball bearings are used to secure adjacent plate sections together and how the ball bearings are aligned within a groove in the frame.

In the first conveyor 118A, the main conveying plate comprises a plurality of plate sections 180 (e.g., 180a, 180b, 180c, 180d, etc.) which are interconnected together. The plate sections are sized and shaped in order to permit the main conveying plate to be conveyed in a loop while maintaining material 120 under pressure during substantially all of the heating process. Exemplary plate sections are illustrated in FIGS. 5 and 6. Each plate section 180 comprises a main body section 182 and a plurality of protrusions 184 and recesses 186. As generally shown in the figures, the protrusions 184 of a first plate section engage corresponding recesses 186 in an adjacent second plate section, and so on. A shaft 189 extending through a plurality of ball bearings 190 and openings 185 in the protrusions 184 is used to secure the adjacent plate sections 180 together. As shown in FIG. 5, the plate sections 180 (e.g., 180a, 180b, 180c, 180d, etc.) of the main conveying plate preferably each have one or more recesses 188 for engaging the teeth of the driver. The second conveyor 118B is constructed in a like manner.

Figure 7:
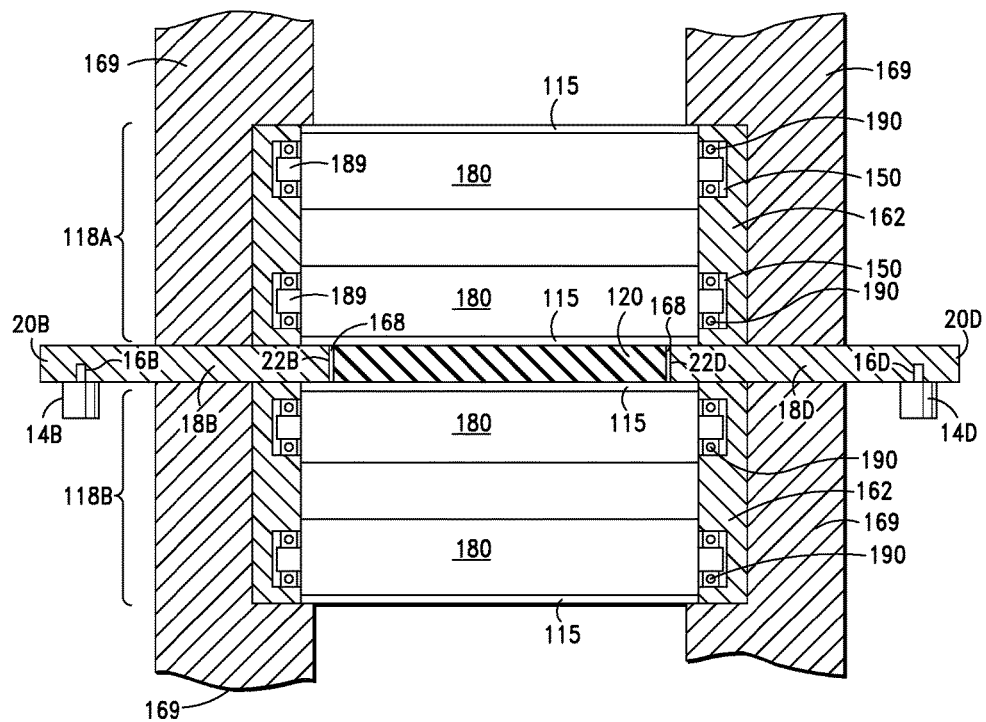
FIG. 7 is a cross-section of the heating apparatus shown in FIG. 4 illustrating two of the magnetron assemblies used in the apparatus.

As shown in FIGS. 4, 6 and 7, the ball bearings 190 are retained in a groove 150 formed in a conveyor frame 162. The path of conveyors 118A, 118B corresponds to the path taken as ball bearings 190 move along groove 150. For clarity, conveyor frame 162 is not illustrated in FIG. 4; however, the location of groove 150 is shown in dashed lines in order to indicate the path of conveyors 118A, 118B as they move along groove 150 in conveyor frame 162. As shown in FIG. 7, conveyor frame 162 is surrounded by an exterior frame 169.

Referring still to FIG. 7, conveyor frame 162 includes two pressure pieces 168 positioned adjacent the sides of material 120 that extend along the entire length of conveyors 118A, 118B. For clarity, pressure pieces 168 are not illustrated in FIG. 4. Pressure pieces 168 and conveyors 118A, 118B together maintain material 120 under pressure as the material moves through the apparatus. Pressure pieces 168 and the speed of conveyors 118A, 118B control the width of material 120 as the material moves through the apparatus. As can be seen in FIG. 4, material 120 is thicker and wider as it exits hopper 130 and is quickly compressed and narrowed in width as it enters the heating region defined by conveyors 118, 118B and pressure pieces 168. In this example, the heating region defined by conveyors 118A, 118B and pressure pieces 168 is about 12 to 72 inches in width (i.e., the width of the material between the pressure pieces), about 36 to 180 inches in length (i.e., the horizontal distance that the material travels between the conveyors), and about ⅛ to 4 or more inches in height (i.e., the height or thickness of the material between the conveyors).

In accordance with the invention, apparatus 110 includes four magnetron assemblies each of which includes a magnetron with an antenna and an associated waveguide. Two magnetron assemblies are positioned on each side of material 120. FIG. 7 shows the detailed structural configuration of two of the magnetron assemblies positioned on opposing sides of material 120 (it can be appreciated that the other two magnetron assemblies are positioned behind the magnetron assemblies shown in FIG. 7). For clarity, the magnetron assemblies are not illustrated in FIG. 4.

Referring to FIG. 7, the magnetron assembly shown on the left side of material 120 includes a magnetron 14B with an antenna 16B that penetrates a side of and extends into a rectangular waveguide 18B. Similarly, the magnetron assembly shown on the right side of material 120 includes a magnetron 14D with an antenna 16D that penetrates a side of and extends into a rectangular waveguide 18D. Waveguides 18B, 18D each extend between a closed end 20B, 20D and an open end 22B, 22D and are fixed within conveyor frame 162. As can be seen, open ends 22B, 22D are positioned in close proximity to material 120 with pressure pieces 168 positioned therebetween. Pressure pieces 168 are preferably very thin and made of a material that undergoes limited heating during the heating process and that has low friction so as to facilitate removal of the material, such as silicone rubber with a Teflon™ coating available from Chemours.

Preferably, the height or thickness of material 120 is maximized and the width of material 120 is minimized in order to obtain more even heat. In one example, the height or thickness of material 120 is x, and each of the rectangular waveguides has cross sectional dimensions comprising a height of x (to match the thickness of the material) and a width of 2x. Of course, one skilled in the art will understand that the cross sectional dimensions of each of the rectangular waveguides determine the wavelengths (and thus the frequencies) that can be supported.

It can be appreciated that the structural configuration and operation of the four magnetron assemblies of heating apparatus 110 are the same as those discussed above in connection with heating apparatus 10.

One example of material 120 to be heated by heating apparatus 110 is vulcanized crosslinked elastomers, such as vulcanized rubber found in tires, hoses, belts, and other vulcanized rubber products. During the vulcanization process, the rubber is mixed with accelerators, promoters and/or initiators that are used to form large numbers of sulfur crosslinks. After vulcanization, the crosslinked rubber becomes thermoset and cannot be reformed into other products. As a result, vulcanized rubber products are generally discarded after they have worn-out because there is very little use for them after they have served their original intended purpose.

In this example, vulcanized rubber is heated and devulcanized when fed between conveyors 118A, 118B of heating apparatus 110 (wherein the vulcanized rubber may optionally be mixed with fresh unvulcanized rubber). In operation, four overlapping microwaves propagate across the vulcanized rubber from the left to the right and four overlapping microwaves propagate across the vulcanized rubber from the right to the left. The total voltage of the eight overlapping microwaves applied to the vulcanized rubber is substantially constant across the material. This results in substantially even heating of the vulcanized rubber so as to devulcanize the crosslinked elastomer particles. The vulcanized rubber typically reaches a temperature in the range of about 160° C. to 190° C. during the devulcanization process and exits apparatus 110 in a state that is largely devulcanized.

The vulcanized rubber is exposed to the eight overlapping microwaves for an exposure time that is controlled by adjusting the speed of the conveyors, and typically ranges from 10 seconds to 50 seconds or longer for certain applications. The required exposure time is dependent on the thickness and width of the material, the total voltage applied and the frequency of the microwaves. For example, if the total voltage of the eight overlapping microwaves is 8,000 V and the frequency of the microwaves is 0.915 GHz, an exposure time of about 10 to 50 seconds is typically sufficient to devulcanize the rubber. Of course, it should be understood that the speed of the conveyors (which is adjusted to control the exposure time) impacts the throughput, i.e., the amount of rubber that can be vulcanized per minute.

While the present invention has been described and illustrated hereinabove with reference to several exemplary embodiments, it should be understood that various modifications could be made to these embodiments without departing from the scope of the invention. Therefore, the present invention is not to be limited to the specific configuration or methodology of the exemplary embodiments, except insofar as such limitations are included in the following claims.

What is claimed and desired to be secured by Letters Patent is as follows:

1. A process for heating a material, comprising:
    applying a plurality of first overlapping microwaves to a first side of the material, wherein the first overlapping microwaves comprise at least a first unreflected wave and a first reflected wave generated by a first microwave energy source, wherein the first reflected wave is out of phase with the first unreflected wave; and
    applying a plurality of second overlapping microwaves to a second opposing side of the material, wherein the second overlapping microwaves comprise at least a second unreflected wave and a second reflected wave generated by a second microwave energy source, wherein the second reflected wave is out of phase with the second unreflected wave.

2. The process of claim 1, wherein the first overlapping microwaves propagate in a first direction through the material and the second overlapping microwaves propagate in a second opposing direction through the material to provide a total wave voltage that is substantially constant across the material.

3. The process of claim 2 wherein a difference between the total wave voltage at a point on or within the material compared to the total wave voltage at each other point on or within the material is less than about 20%.

4. The process of claim 2 wherein a difference between the total wave voltage at a point on or within the material compared to the total wave voltage at each other point on or within the material is less than about 10%.

5. The process of claim 2 wherein the total wave voltage results in substantially even heating of the material.

6. The process of claim 5 wherein a difference between a temperature at a point on or within the material compared to a temperature at each other point on or within the material is less than about 40° C.

7. The process of claim 5 wherein a difference between a temperature at a point on or within the material compared to a temperature at each other point on or within the material is less than about 20° C.

8. The process of claim 1 wherein the heating causes the material to be one of dried, molded, or cured.

9. The process of claim 1 wherein the first and second overlapping microwaves each comprise two overlapping microwaves with a phase shift of 90 degrees between individual microwaves.

10. The process of claim 1 wherein the first and second overlapping microwaves each comprise four overlapping microwaves with a phase shift of 45 degrees between individual microwaves.

11. The process of claim 1 wherein the first and second overlapping microwaves each comprise eight overlapping microwaves with a phase shift of 22.5 degrees between individual microwaves.

12. The process of claim 1 wherein the material is heated in a batch mode of operation.

13. The process of claim 12 wherein the first and second energy sources are associated with first and second waveguides, respectively, wherein the material is placed on a surface in a heating region positioned between the first and second waveguides during the batch mode of operation.

14. The process of claim 1 wherein the material is heated in a continuous mode of operation.

15. The process of claim 14 wherein the first and second energy sources are associated with first and second waveguides, respectively, wherein the material is continuously fed on a conveyor between the first and second waveguides during the continuous mode of operation.

16. The process of claim 1 wherein individual microwaves of the first and second overlapping microwaves each have a frequency in a range of about 0.3 GHz to about 300 GHz.

17. A process for heating a material, comprising:
    placing the material on a surface in a heating region, wherein the surface is positioned between a first magnetron assembly and a second magnetron assembly;
    activating the first magnetron assembly to apply a plurality of first overlapping microwaves to a first side of the material, wherein the first overlapping microwaves comprise a first unreflected wave and a first reflected wave, wherein the first reflected wave is out of phase with the first unreflected wave; and
    activating the second magnetron assembly to apply a plurality of second overlapping microwaves to a second opposing side of the material, wherein the second overlapping microwaves comprise a second unreflected wave and a second reflected wave, wherein the second reflected wave is out of phase with the second unreflected wave;
    wherein the first overlapping microwaves propagate in a first direction through the material and the second overlapping microwaves propagate in a second opposing direction through the material to provide a total wave voltage that is substantially constant across the material.

18. The process of claim 17 wherein a difference between the total wave voltage at a point on or within the material compared to the total wave voltage at each other point on or within the material is less than about 20%.

19. The process of claim 17 wherein a difference between the total wave voltage at a point on or within the material compared to the total wave voltage at each other point on or within the material is less than about 10%.

20. The process of claim 17 wherein the total wave voltage results in substantially even heating of the material.

21. The process of claim 20 wherein a difference between a temperature at a point on or within the material compared to a temperature at each other point on or within the material is less than about 40° C.

22. The process of claim 20 wherein a difference between a temperature at a point on or within the material compared to a temperature at each other point on or within the material is less than about 20° C.

23. The process of claim 17 wherein the heating causes the material to be one of dried, molded, or cured.

24. The process of claim 17 wherein the material is heated on the surface in a batch mode of operation.

25. The process of claim 17 wherein the surface comprises a conveyor that continuously feeds the material between the first and second magnetron assemblies, wherein the material is heated on the conveyor in a continuous mode of operation.

26. The process of claim 17 wherein individual microwaves of the first and second overlapping microwaves each have a frequency in a range of about 0.3 GHz to about 300 GHz.

27. The process of claim 17 wherein:
the first magnetron assembly comprises a first magnetron associated with a first waveguide that extends between a closed end and an open end, wherein (i) the first unreflected wave is generated by the first magnetron and propagates toward the open end of the first waveguide and (ii) the first reflected wave is generated by the first magnetron and propagates toward the closed end of the first waveguide, reflects off the closed end, and propagates toward the open end of the first waveguide; and
the second magnetron assembly comprises a second magnetron associated with a second waveguide that extends between a closed end and an open end, wherein (i) the second unreflected wave is generated by the second magnetron and propagates toward the open end of the second waveguide and (ii) the second reflected wave is generated by the second magnetron and propagates toward the closed end of the second waveguide, reflects off the closed end, and propagates toward the open end of the second waveguide.

* * * * *